(12) United States Patent
Baig (10) Patent No.: US 10,314,386 B1
(45) Date of Patent: Jun. 11, 2019

(54) MOUNTING GARMENT ASSEMBLY

(71) Applicant: Haris Baig, Stafford, VA (US)

(72) Inventor: Haris Baig, Stafford, VA (US)

(*) Notice: Subject to any disclaimer, the term of this patent is extended or adjusted under 35 U.S.C. 154(b) by 0 days.

(21) Appl. No.: 15/878,119

(22) Filed: Jan. 23, 2018

(51) Int. Cl.
*A45F 3/14* (2006.01)
*A45F 5/00* (2006.01)
*H04B 1/3827* (2015.01)

(52) U.S. Cl.
CPC ............... *A45F 5/00* (2013.01); *H04B 1/385* (2013.01); *A45F 2200/0516* (2013.01)

(58) Field of Classification Search
CPC ...... Y10S 224/93; F16M 13/04; F16M 13/00; A45F 5/00; A45F 2200/0516; A45F 2200/0525; A45F 3/14; A45F 2003/142; A45F 2003/144; A45F 2003/146; G06F 1/163; G06F 1/1628
USPC ........................................................ 224/930
See application file for complete search history.

(56) References Cited

U.S. PATENT DOCUMENTS

| | | | | |
|---|---|---|---|---|
| 2,990,089 A * | 6/1961 | Nystrom | ............ | A45F 5/00 224/628 |
| 3,114,486 A * | 12/1963 | Flexman | ............ | A45F 3/08 224/148.6 |
| 3,661,308 A * | 5/1972 | Walters | ............ | F16M 13/04 224/258 |
| 4,802,211 A | 1/1989 | Huntley | | |
| 5,346,111 A | 9/1994 | Huntley et al. | | |
| 6,359,609 B1 * | 3/2002 | Kuenster | ............ | G06F 1/163 224/270 |
| 7,798,452 B1 * | 9/2010 | Wessells | ............ | F16M 11/10 248/163.1 |
| 8,002,159 B2 * | 8/2011 | Cragg | ............ | A45F 5/02 224/579 |
| 8,418,900 B1 * | 4/2013 | Baker | ............ | A45F 5/00 224/262 |
| 8,485,405 B2 * | 7/2013 | Crye | ............ | F41A 9/65 224/251 |
| 8,608,041 B1 * | 12/2013 | Adkisson | ............ | A45F 5/00 2/102 |
| 8,675,352 B2 * | 3/2014 | Wessells | ............ | A45F 5/00 361/679.01 |
| 8,881,961 B1 | 11/2014 | Cibirka | | |
| 9,066,507 B2 * | 6/2015 | Silverman | ............ | A45F 5/00 |
| 2007/0164987 A1 | 7/2007 | Graham | | |
| 2013/0214022 A1 | 8/2013 | Harvey | | |
| 2015/0195392 A1 | 7/2015 | Nissenbaum | | |
| 2015/0327658 A1 * | 11/2015 | Swan | ............ | A45F 5/00 224/660 |
| 2016/0367021 A1 * | 12/2016 | Moreau | ............ | A45F 3/00 |
| 2017/0251793 A1 * | 9/2017 | Barratt | ............ | F16M 11/041 |
| 2018/0003338 A1 * | 1/2018 | Scott | ............ | A45F 5/00 |

* cited by examiner

Primary Examiner — Adam J Waggenspack (57) ABSTRACT

A mounting garment assembly for facilitating hands-free use of an electronic device includes a harness that is selectively worn on a torso. A pair of mounts is each coupled to the harness such that each of the mounts is positioned on a chest when the harness is worn. A mounting unit is provided and the mounting unit is removably coupled to a selected one of the mounts. The mounting unit receives an electronic device thereby facilitating hands-free use of the electronic device. Moreover, the mounting unit is flexible thereby facilitating the electronic device to be positioned at a selected angle with respect to a user.

10 Claims, 7 Drawing Sheets

MOUNTING GARMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to mounting devices and more particularly pertains to a new mounting device for facilitating hands-free use of an electronic device.

BRIEF SUMMARY OF THE INVENTION

An embodiment of the disclosure meets the needs presented above by generally comprising a harness that is selectively worn on a torso. A pair of mounts is each coupled to the harness such that each of the mounts is positioned on a chest when the harness is worn. A mounting unit is provided and the mounting unit is removably coupled to a selected one of the mounts. The mounting unit receives an electronic device thereby facilitating hands-free use of the electronic device. Moreover, the mounting unit is flexible thereby facilitating the electronic device to be positioned at a selected angle with respect to a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
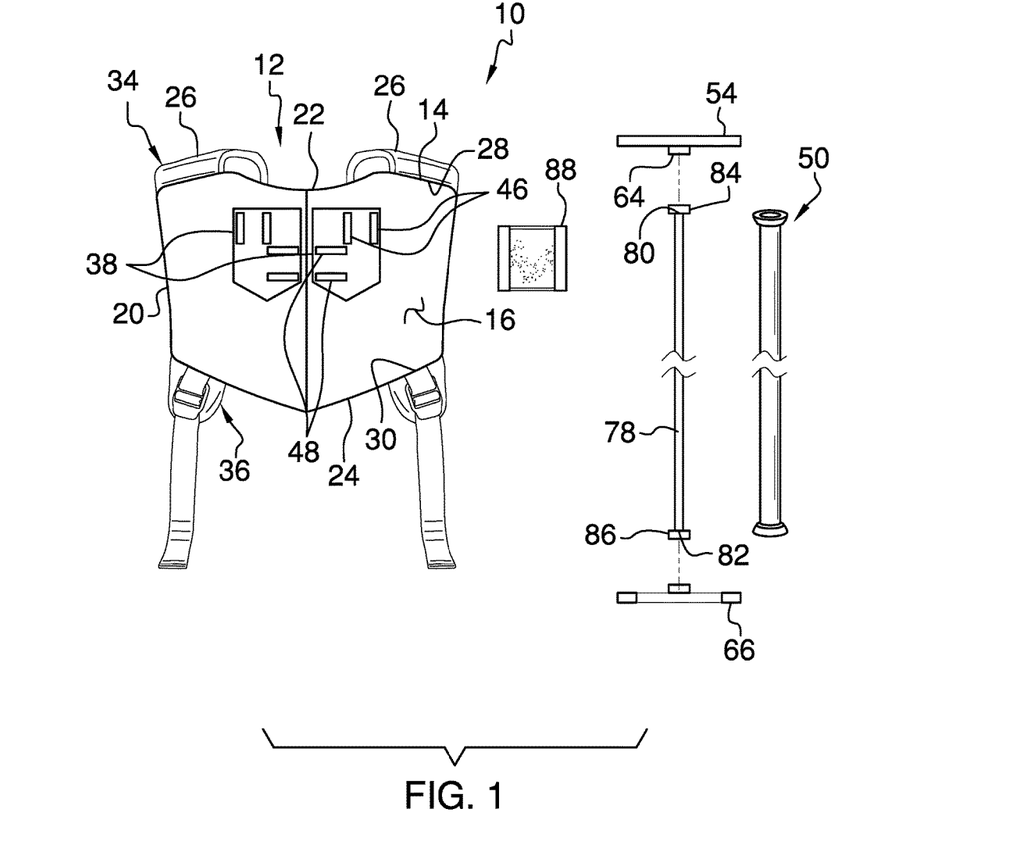
FIG. 1 is a kit view of a mounting garment assembly according to an embodiment of the disclosure.
Figure 2:
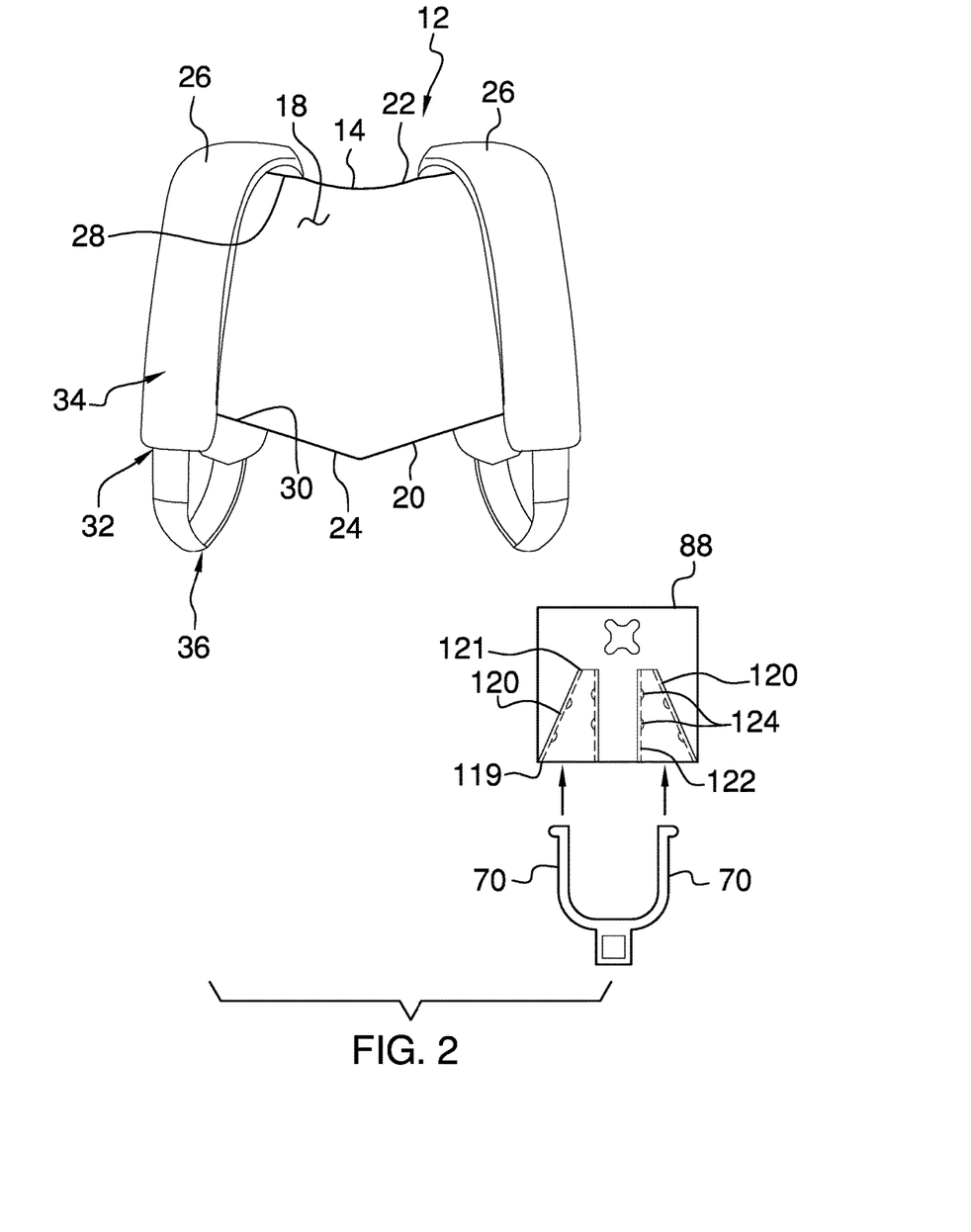
FIG. 2 is a back view of harness and a clamp of an embodiment of the disclosure.
Figure 3:
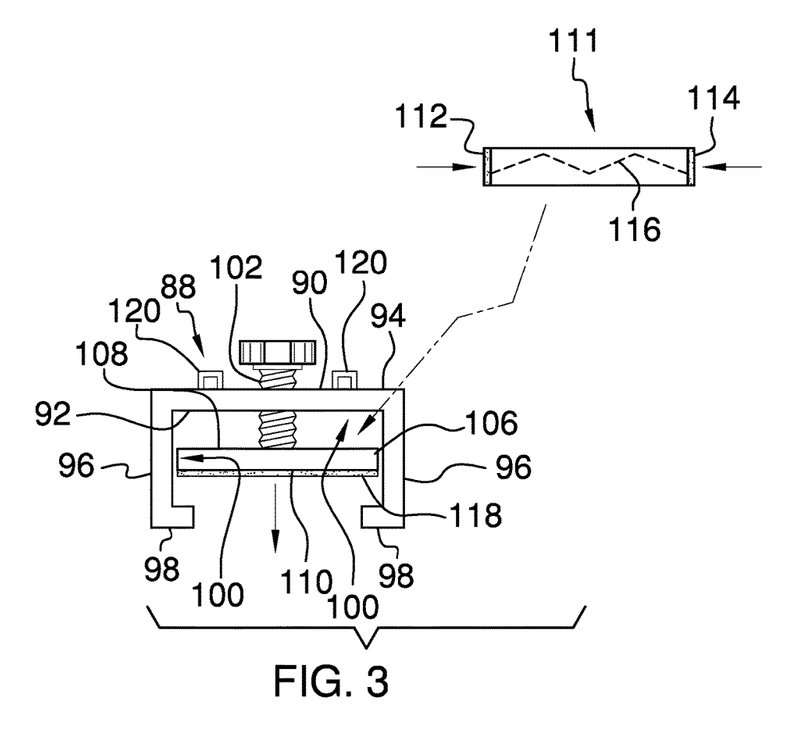
FIG. 3 is a perspective view of clamp of an embodiment of the disclosure.
Figure 4:
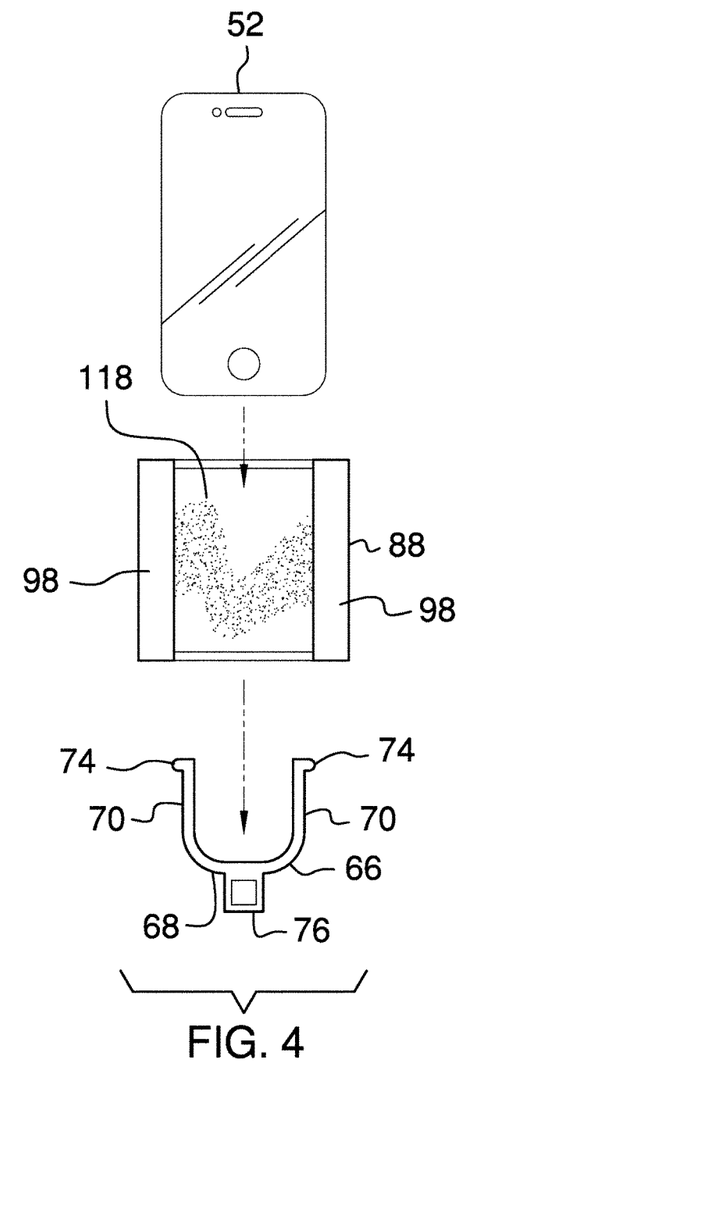
FIG. 4 is an exploded perspective view of a clamp of an embodiment of the disclosure.
Figure 5:
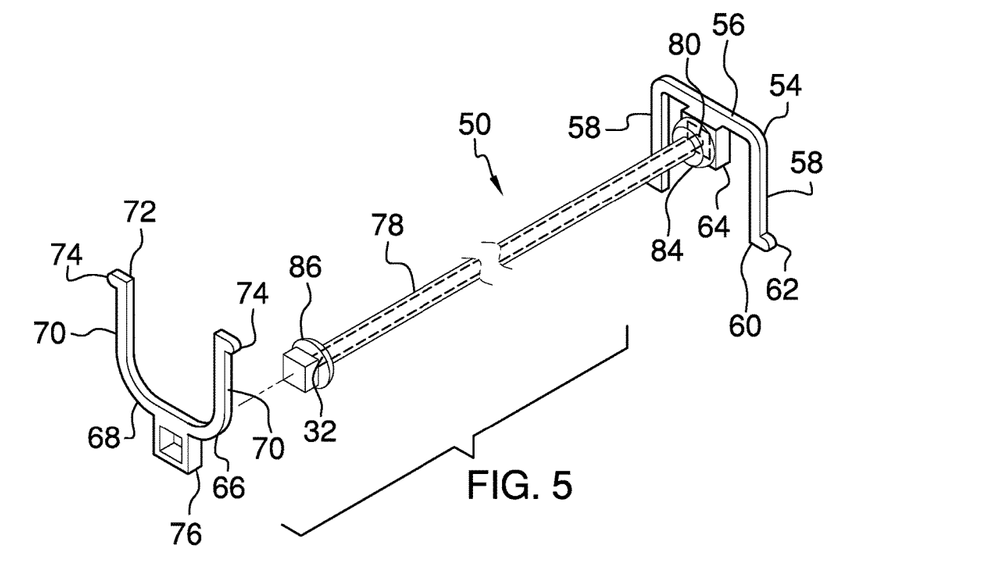
FIG. 5 is an exploded perspective view of a mounting unit of an embodiment of the disclosure.
Figure 6:
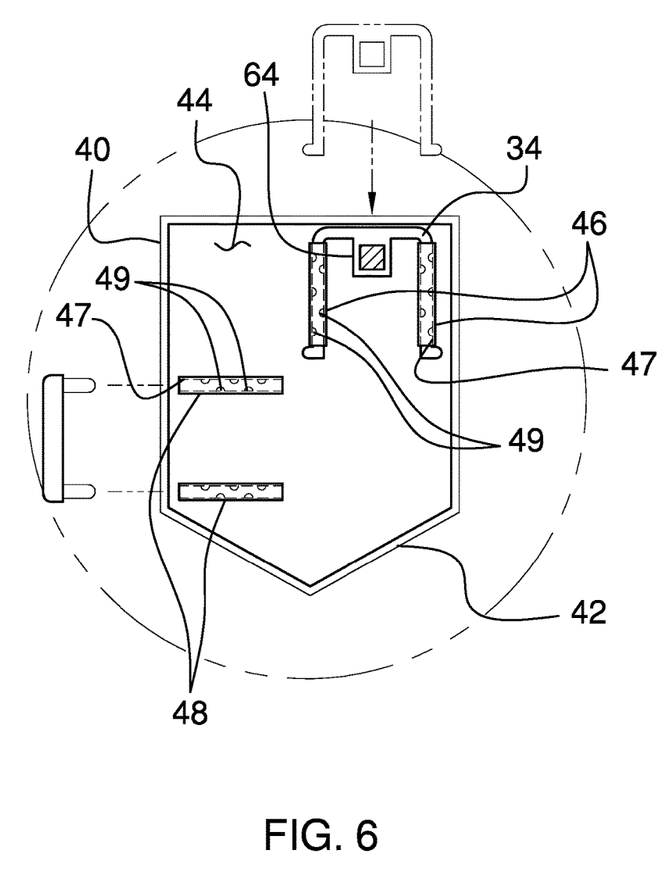
FIG. 6 is a front perspective view of mount and a first yoke of an embodiment of the disclosure.
Figure 7:
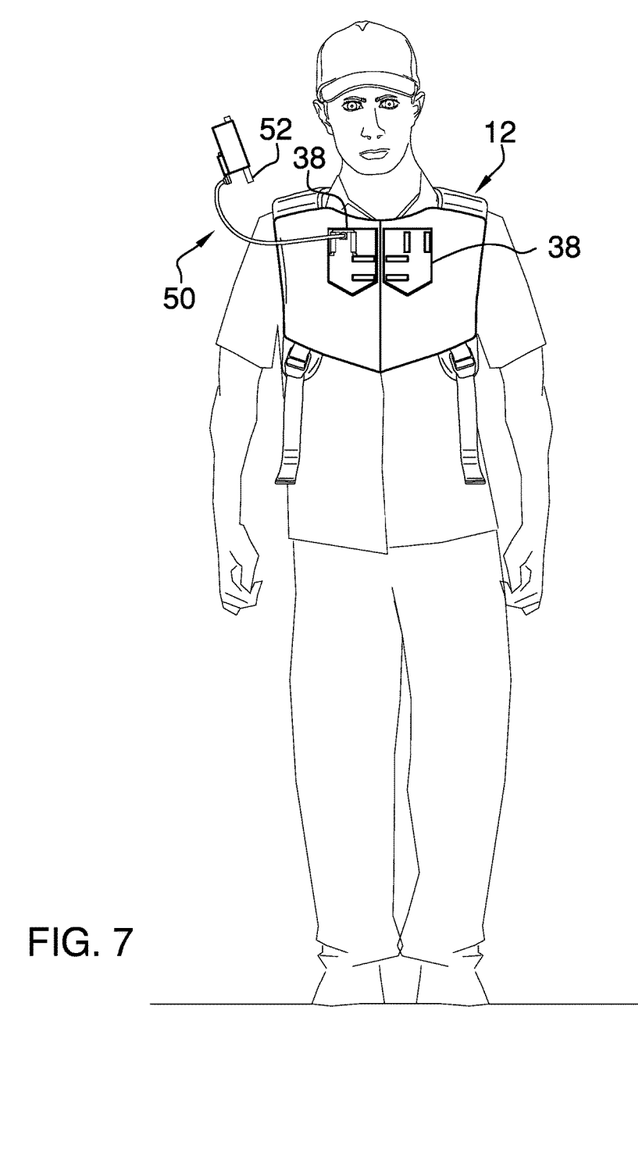
FIG. 7 is a perspective in-use view of an embodiment of the disclosure.

With reference now to the drawings, and in particular to FIGS. 1 through 7 thereof, a new mounting device embodying the principles and concepts of an embodiment of the disclosure and generally designated by the reference numeral 10 will be described.

As best illustrated in FIGS. 1 through 7, the mounting garment assembly 10 generally comprises a harness 12 that is worn on a torso while performing activities requiring both hands. The harness 12 comprises a chest plate 14 that has a first surface 16, a second surface 18 and a peripheral edge 20 extending therebetween and the peripheral edge 20 has a top side 22 and bottom side 24. The bottom side 24 may taper to a point at a center of the chest plate 14. The chest plate 14 may have a width and a height sufficient to substantially cover a chest when the harness 12 is worn. Additionally, the chest plate 14 may be comprised of a rigid material such as plastic or the like.

The harness 12 includes a pair of shoulder straps 26 and each of the shoulder straps 26 is coupled to the chest plate 14. Each of the shoulder straps 26 is worn over shoulders such that the second surface 18 of the chest plate 14 is positioned on the chest. Each of the shoulder straps 26 has a first end 28 and a second end 30 and the first end 28 corresponding to each of the shoulder straps 26 is releasably coupled to the top side 22 of the peripheral edge 20 of the chest plate 14. The second end 30 corresponding each of the shoulder straps 26 is releasably coupled to the bottom side 24 of the peripheral edge 20 of the chest plate 14. The releasable coupling of the shoulder straps 26 to the chest plate 14 may be accomplished with any conceivable releasable fastener, including but not being limited to, buckles, complementary clips and any other mechanical or frictional fastener.

Each of the shoulder straps 26 has a break 32 therein to define a first portion 34 of the shoulder straps 26 and a second portion 36 of the shoulder straps 26. The first portion 34 corresponding to each of the shoulder straps 26 is releasably matable to the second portion 36 of the corresponding shoulder strap. Moreover, each of the first portion 34 and the second portion 36 corresponding to each of the shoulder straps 26 may include a buckle or the like for releasably coupling the first portion 34 to the second portion 36 of the corresponding shoulder strap 26.

A pair of mounts 38 is included and each of the mounts 38 is coupled to the harness 12. Each of the mounts 38 is positioned on the chest when the harness 12 is worn. The mounts 38 are spaced apart from and are aligned with each other on the harness 12. Each of the mounts 38 comprises a plate 40 that has a primary surface 42 and a secondary surface 44 and the primary surface 42 is coupled to the first surface 16 of the chest plate 14.

Each of the mounts 38 includes a set of first sleeves 46 and each of the first sleeves 46 is coupled to the secondary surface 44 of the plate 40. The first sleeves 46 are spaced apart from each other and each of the first sleeves 46 is vertically oriented on the plate 40. Each of the mounts 38 includes a set of second sleeves 48 and each of the second sleeves 48 is coupled to the secondary surface 44 of the plate 40. The second sleeves 48 are spaced apart from each other and each of the second sleeves 48 is horizontally oriented on the plate 40. The set of second sleeves 48 is positioned below the set of first sleeves 46 on the plate 40. Each of the first 46 and second 48 sleeves has an interior surface 47, and the interior surface 47 corresponding to each of the first 46 and second 48 sleeves has a plurality of protrusions 49 thereon. The protrusions 49 on each of the first 46 and second 48 sleeves may be comprised of a resiliently compressible material such as rubber or the like.

A mounting unit 50 is provided and the mounting unit 50 is removably coupled to a selected one of the mounts 38. Additionally, the mounting unit 50 receives an electronic device 52, such as a smart phone or the like, thereby facilitating hands-free use of the electronic device 52. The mounting unit 50 is flexible thereby facilitating the electronic device 52 to be positioned at a selected angle with respect to a user. In this way the electronic device 52 may be positioned to record video footage of the user and the electronic device 52 may be positioned to record the user's first person perspective.

The mounting unit 50 comprises a first yoke 54 that has a central member 56 extending between a pair of outward members 58. The outward members 58 are spaced apart from each other and are oriented perpendicular to the central member 56 such that the first yoke 54 has a U-shape. Each of the outward members 58 has a distal end 60 with respect to the central member 56 and each of the outward members 58 has a foot 62 extending laterally away therefrom. The foot 62 is aligned with the distal end 60 of the corresponding outward member 58.

Each of the outward members 58 is slidably inserted into the set of first sleeves 46 on a selected one of the mounts 38. Each of the feet 62 engages a terminal end of an associated one of the first sleeves 46 when the outward members 58 are extended through the first sleeves 46. In this way the first yoke 54 is inhibited from being removed from the first sleeves 46. Each of the protrusions 49 in the first sleeves 46 frictionally engages the outward members 58 to restrict lateral motion of the outward members 58 in the first sleeves 46. A first receiver 64 is coupled to and extends downwardly from the central member 56 and the first receiver 64 is centrally positioned between the outward members 58.

The mounting unit 50 includes a second yoke 66 that has a central member 68 extending between a pair of outward members 70. The outward members 70 of the second yoke 66 are spaced apart from each other and are oriented perpendicular to the central member 68 of the second yoke 66 such that the second yoke 66 has a U-shape. Each of the outward members 70 of the second yoke 66 has a distal end 72 with respect to the central member 68 of the second yoke 66 and each of the outward members 70 of the second yoke 66 has a foot 74 extending laterally away therefrom. The foot 74 corresponding to the second yoke 66 is aligned with the distal end 72 of the corresponding outward member 70 of the second yoke 66.

Each of the outward members 70 of the second yoke 66 is slidably inserted into the set of second sleeves 48 on a selected one of the mounts 38. Each of the feet 74 corresponding to the second yoke 66 engages a terminal end of an associated one of the second sleeves 48 when the outward members 70 of the second yoke 66 are extended through the second sleeves 48. In this way the second yoke 66 is inhibited from being removed from the second sleeves 48. Each of the protrusions 49 in the second sleeves 48 frictionally engages the outward members 70 of the second yoke 66 to inhibit lateral motion of the outward members 70 of the second yoke 66 in the second sleeves 48. A second receiver 76 is coupled to and extends downwardly from the central member 68 of the second yoke 66. The second receiver 76 is centrally positioned between the outward members 70 of the second yoke 66.

The mounting unit 50 includes a rod 78 that has a first end 80 and a second end 82 and the rod 78 is comprised of a resiliently flexible material. A first coupler 84 is coupled to the first end 80 of the rod 78 and the first coupler 84 engages the first receiver 64. In this way the rod 78 is removably coupled to the first yoke 54 and the rod 78 extends away from the chest when the harness 12 is worn. A second coupler 86 is coupled to the second end 82 of the rod 78 and the second coupler 86 engages the second receiver 76. In this way the second yoke 66 is removably coupled to the rod 78 and the second yoke 66 is spaced from the chest when the harness 12 is worn.

The mounting unit 50 includes a clamp 88 that releasably engages the electronic device 52. Moreover, the clamp 88 is removably coupled to the second yoke 66 to retain the electronic device 52 in a selected orientation with respect to the user. The clamp 88 comprises a panel 90 that has a first surface 92 and a second surface 94. A pair of legs 96 is coupled to the first surface 92 of the panel 90 and the legs 96 are spaced apart from each other. A pair of feet 98 is each coupled to an associated one of the legs 96. The feet 98 are spaced apart from and are coextensive from the first surface 92 of the panel 90 to define a space 100 extending between the feet 98 and the first surface 92. Moreover, the space 100 insertably receives the electronic device 52.

A screw 102 extends through the panel 90 and the screw 102 has a distal end 104 with respect to the first surface 92 of the panel 90. The screw 102 is selectively rotated in a first direction such that the distal end 104 moves toward the feet 95. The screw 102 is selectively rotated in a second direction such that the distal end 104 moves away from the feet 95. A sheet 106 is provided that has a first surface 108 and a second surface 110 and the first surface 108 of the sheet 106 is coupled to the distal end 104 of the screw 102. The sheet 106 is comprised of a rigid material such as steel or the like.

A spacer 111 is provided that has a first lateral side 112 being movably positioned with respect to a second lateral side 114. A biasing member 116 is positioned within the spacer 111 to bias the first 112 and second 114 lateral sides away from each other. The spacer 111 is selectively positioned between the first surface of the sheet 106 and the first surface 92 of the panel 90. Moreover, the biasing member 116 urges the first 112 and second 114 lateral sides of the clamp 88 to frictionally engage an associated one of the legs 96 to retain the spacer 111 in the clamp 88. A pad 118 is coupled to the second surface 110 of the sheet 106 and the pad 118 compresses the electronic device 52 between the sheet 106 and each of the feet 98 of the clamp 88 when the screw 102 is manipulated in the first direction. Moreover, the pad 118 is comprised of a resiliently compressible material to frictionally engage the electronic device 52.

A pair of third sleeves 120 is each coupled to the second surface of the panel 90. Additionally, each the third sleeves 120 has a first end 119 and a second end 121 and each of the third sleeves 120 tapers inwardly between the first end 119 and the second end 121. Thus, each of the third sleeves 120 defines an inverted V on the panel 90. Each of the outward members 70 of the second yoke 66 is inserted into the first end 119 of a corresponding third sleeve 120. The taper of each third sleeve 120 facilitates one handed coupling between the second yoke 66 and the third sleeves 120. Each of the third sleeves 120 has an inside surface 122 and the inside surface 122 corresponding to each of the third sleeves 120 has a plurality of protrusions 124 thereon. The protrusions 124 on the third sleeves 120 frictionally engage the outward members 70 of the second yoke 66 to inhibit lateral motion of the outward members 70 of the second yoke 66 in the third sleeves 120.

In use, the harness 12 is worn and the first yoke 54 is inserted into the first sleeves 46 on a selected one of the mounts 38. The first coupler 84 on the rod 78 is coupled to the first receiver 64 and the second coupler 86 on the rod 78 is coupled to the second receiver 76. Thus, the second yoke 66 is retained on the rod 78 and the clamp 88 is positioned at a selected angle with respect to the user. The electronic device 52 is positioned in the clamp 88 and the screw 102 is manipulated to tighten the electronic device 52 in the clamp 88. Thus, the electronic device 52 is retained at a selected orientation with respect to the user for hand-free recording of video and the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mounting garment assembly being configured to attach an electronic device to a user's body thereby facilitating hands-free use of the electronic device, said assembly comprising:
   a harness being configured to be worn;
   a pair of mounts, each of said mounts being coupled to said harness wherein each of said mounts is configured to be positioned on a chest when said harness is worn, said mounts being spaced apart from and being aligned with each other on said harness; and
   a mounting unit being removably coupled to a selected one of said mounts, said mounting unit being configured to receive an electronic device thereby facilitating hands-free use of the electronic device, said mounting unit including a rod, said rod being flexible wherein said mounting unit is configured to position the electronic device at a selected angle with respect to a user, said mounting unit comprising
      a first yoke having a central member extending between a pair of outward members, said outward members being spaced apart from each other and being oriented perpendicular to said central member such that said first yoke has a U-shape, each of said outward members having a distal end with respect to said central member,
      a first receiver being coupled to and extending downwardly from said central member, said first receiver being centrally positioned between said outward members,
      a second yoke having a central member extending between a pair of outward members, said outward members of said second yoke being spaced apart from each other and being oriented perpendicular to said central member of said second yoke such that said second yoke has a U-shape, each of said outward members of said second yoke having a distal end with respect to said central member of said second yoke, each of said outward members of said second yoke has a foot extending laterally away therefrom, said foot corresponding to said second yoke being aligned with said distal end of said corresponding outward member of said second yoke,
      a second receiver being coupled to and extending downwardly from said central member of said second yoke, said second receiver being centrally positioned between said outward members of said second yoke,
      said rod having a first end and a second end, said rod being comprised of a resiliently flexible material,
      a first coupler being coupled to said first end of said rod, said first coupler engaging said first receiver such that said rod is removably coupled to said first yoke wherein said rod is configured to extend away from the chest when said harness is worn, and
      a second coupler being coupled to said second end of said rod, said second coupler engaging said second receiver such that said second yoke is removably coupled to said rod wherein said second yoke is configured to be spaced from the chest when said harness is worn.

2. The assembly according to claim 1, wherein said harness comprises:
   a chest plate having a first surface, a second surface and a peripheral edge extending therebetween, said peripheral edge having a top side and bottom side; and
   a pair of shoulder straps, each of said shoulder straps being coupled to said chest plate wherein each of said shoulder straps is configured to be worn over shoulders wherein said second surface of said chest plate is configured to be positioned on a chest, each of said shoulder straps having a first end and a second end, said first end corresponding to each of said shoulder straps being coupled to said top side of said peripheral edge of said chest plate, said second end corresponding each of said shoulder straps being coupled to said bottom side of said peripheral edge of said chest plate, each of said shoulder straps having a break therein to define a first portion of said shoulder straps and a second portion of said shoulder straps, said first portion corresponding to each of said shoulder straps being releasably matable to said second portion of said corresponding shoulder strap.

3. The assembly according to claim 2, wherein each of said mounts comprises a plate having a primary surface and a secondary surface, said primary surface being coupled to said first surface of said chest plate.

4. The assembly according to claim 3, further comprising a set of first sleeves, each of said first sleeves being coupled to said secondary surface of said plate, said first sleeves being spaced apart from each other, each of said first sleeves being vertically oriented on said plate.

5. The assembly according to claim 4, further comprising a set of second sleeves, each of said second sleeves being coupled to said secondary surface of said plate, said second sleeves being spaced apart from each other, each of said second sleeves being horizontally oriented on said plate, said second set of sleeves being positioned below said first set of sleeves on said plate.

6. The assembly according to claim 1, wherein each of said outward members has a foot extending laterally away therefrom, said foot being aligned with said distal end of said corresponding outward member, each of said outward members being slidably inserted into said set of first sleeves on a selected one of said mounts, each of said feet engaging a terminal end of an associated one of said first sleeves when said outward members are extended through said first sleeves to inhibit said first yoke from being removed from said first sleeves.

7. A mounting garment assembly being configured to attach an electronic device to a user's body thereby facilitating hands-free use of the electronic device, said assembly comprising:
  a harness being configured to be worn;
  a pair of mounts, each of said mounts being coupled to said harness wherein each of said mounts is configured to be positioned on a chest when said harness is worn, said mounts being spaced apart from and being aligned with each other on said harness; and
  a mounting unit being removably coupled to a selected one of said mounts, said mounting unit being configured to receive an electronic device thereby facilitating hands-free use of the electronic device, said mounting unit including a rod, said rod being flexible wherein said mounting unit is configured to position the electronic device at a selected angle with respect to a user, said mounting unit comprising
    a first yoke having a central member extending between a pair of outward members, said outward members being spaced apart from each other and being oriented perpendicular to said central member such that said first yoke has a U-shape, each of said outward members having a distal end with respect to said central member,
    a first receiver being coupled to and extending downwardly from said central member, said first receiver being centrally positioned between said outward members,
    a second yoke having a central member extending between a pair of outward members, said outward members of said second yoke being spaced apart from each other and being oriented perpendicular to said central member of said second yoke such that said second yoke has a U-shape, each of said outward members of said second yoke having a distal end with respect to said central member of said second yoke, and
    a clamp being configured to releasably engage the electronic device, said clamp being removably coupled to said second yoke wherein said clamp is configured to retain the electronic device in a selected orientation with respect to the user.

8. The assembly according to claim 7, wherein said clamp comprises:
  a panel having a first surface and a second surface;
  a pair of legs, each of said legs being coupled to said first surface of said panel, said legs being spaced apart from each other;
  a pair of feet each of said feet being coupled to an associated one of said legs, each of said feet being spaced from and being coextensive from said first surface of said panel to define a space extending between said feet and said first surface wherein said space is configured to insertably receive the electronic device; and
  a screw extending through said panel, said screw having a distal end with respect to said first surface, said screw being selectively rotated in a first direction having said distal end moving toward said feet, said screw being selectively rotated in a second direction having said distal end moving away from said feet.

9. The assembly according to claim 8, wherein said clamp comprises:
  a plate having a first surface and a second surface, said first surface of said plate being coupled to said distal end of said screw;
  a pad being coupled to said second surface of said plate wherein said pad is configured to compress the electronic device between said plate and each of said feet when said screw is manipulated in said first direction, said pad being comprised of a resiliently compressible material wherein said pad is configured to frictionally engage the electronic device; and
  a pair of third sleeves, each of said third sleeves being coupled to said second surface of said panel, each of said outward members of said second yoke being inserted into a selected one of said third sleeves to removably retain said clamp on said second yoke.

10. A mounting garment assembly being configured to attach an electronic device to a user's body thereby facilitating hands-free use of the electronic device, said assembly comprising:
  a harness being configured to be worn, said harness comprising
    a chest plate having a first surface, a second surface and a peripheral edge extending therebetween, said peripheral edge having a top side and bottom side, and
    a pair of shoulder straps, each of said shoulder straps being coupled to said chest plate wherein each of said shoulder straps is configured to be worn over shoulders wherein said second surface of said chest plate is configured to be positioned on a chest, each of said shoulder straps having a first end and a second end, said first end corresponding to each of said shoulder straps being coupled to said top side of said peripheral edge of said chest plate, said second end corresponding each of said shoulder straps being coupled to said bottom side of said peripheral edge of said chest plate, each of said shoulder straps having a break therein to define a first portion of said shoulder straps and a second portion of said shoulder straps, said first portion corresponding to each of said shoulder straps being releasably matable to said second portion of said corresponding shoulder strap;

a pair of mounts, each of said mounts being coupled to said harness wherein each of said mounts is configured to be positioned on a chest when said harness is worn, said mounts being spaced apart from and being aligned with each other on said harness, each of said mounts comprising
- a plate having a primary surface and a secondary surface, said primary surface being coupled to said first surface of said chest plate,
- a set of first sleeves, each of said first sleeves being coupled to said secondary surface of said plate, said first sleeves being spaced apart from each other, each of said first sleeves being vertically oriented on said plate, and
- a set of second sleeves, each of said second sleeves being coupled to said secondary surface of said plate, said second sleeves being spaced apart from each other, each of said second sleeves being horizontally oriented on said plate, said second set of sleeves being positioned below said first set of sleeves on said plate, and a mounting unit being removably coupled to a selected one of said mounts, said mounting unit being configured to receive an electronic device thereby facilitating hands-free use of the electronic device, said mounting unit including a rod, said rod being flexible wherein said mounting unit is configured to position the electronic device at a selected angle with respect to a user, said mounting unit comprising
- a first yoke having a central member extending between a pair of outward members, said outward members being spaced apart from each other and being oriented perpendicular to said central member such that said first yoke has a U-shape, each of said outward members having a distal end with respect to said central member, each of said outward members having a foot extending laterally away therefrom, said foot being aligned with said distal end of said corresponding outward member, each of said outward members being slidably inserted into said set of first sleeves on a selected one of said mounts, each of said feet engaging a terminal end of an associated one of said first sleeves when said outward members are extended through said first sleeves to inhibit said first yoke from being removed from said first sleeves,
- a first receiver being coupled to and extending downwardly from said central member, said first receiver being centrally positioned between said outward members,
- a second yoke having a central member extending between a pair of outward members, said outward members of said second yoke being spaced apart from each other and being oriented perpendicular to said central member of said second yoke such that said second yoke has a U-shape, each of said outward members of said second yoke having a distal end with respect to said central member of said second yoke, each of said outward members of said second yoke having a foot extending laterally away therefrom, said foot corresponding to said second yoke being aligned with said distal end of said corresponding outward member of said second yoke,
- a second receiver being coupled to and extending downwardly from said central member of said second yoke, said second receiver being centrally positioned between said outward members of said second yoke,
- said rod having a first end and a second end, said rod being comprised of a resiliently flexible material,
- a first coupler being coupled to said first end of said rod, said first coupler engaging said first receiver such that said rod is removably coupled to said first yoke wherein said rod is configured to extend away from the chest when said harness is worn,
- a second coupler being coupled to said second end of said rod, said second coupler engaging said second receiver such that said second yoke is removably coupled to said rod wherein said second yoke is configured to be spaced from the chest when said harness is worn, and
- a clamp being configured to releasably engage the electronic device, said clamp being removably coupled to said second yoke wherein said clamp is configured to retain the electronic device in a selected orientation with respect to the user, said clamp comprising
  - a panel having a first surface and a second surface,
  - a pair of legs, each of said legs being coupled to said first surface of said panel, said legs being spaced apart from each other,
  - a pair of feet each of said feet being coupled to an associated one of said legs, each of said feet being spaced from and being coextensive from said first surface of said panel to define a space extending between said feet and said first surface wherein said space is configured to insertably receive the electronic device,
  - a screw extending through said panel, said screw having a distal end with respect to said first surface, said screw being selectively rotated in a first direction having said distal end moving toward said feet, said screw being selectively rotated in a second direction having said distal end moving away from said feet,
  - a plate having a first surface and a second surface, said first surface of said plate being coupled to said distal end of said screw,
  - a pad being coupled to said second surface of said plate wherein said pad is configured to compress the electronic device between said plate and each of said feet when said screw is manipulated in said first direction, said pad being comprised of a resiliently compressible material wherein said pad is configured to frictionally engage the electronic device, and
  - a pair of third sleeves, each of said third sleeves being coupled to said second surface of said panel, each of said outward members of said second yoke being inserted into a selected one of said third sleeves to removably retain said clamp on said second yoke.

* * * * *